United States Patent
Lin (10) Patent No.: US 8,184,433 B2
(45) Date of Patent: May 22, 2012

(54) SWITCH AND ELECTRONIC DEVICE HAVING A PIVOTABLE COVER

(75) Inventor: Shih-Jeh Lin, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 203 days.

(21) Appl. No.: 12/792,520

(22) Filed: Jun. 2, 2010

(65) Prior Publication Data

US 2011/0090644 A1    Apr. 21, 2011

(30) Foreign Application Priority Data

Oct. 20, 2009   (TW) .............................. 98219327 U (51) Int. Cl.
*G06F 1/16* (2006.01)
*H01H 9/26* (2006.01)
*H01H 3/16* (2006.01)
(52) U.S. Cl. .................. 361/679.55; 200/5 A; 200/61.7
(58) Field of Classification Search ............. 361/679.55; 200/5 A, 61.7, 61.73, 61.74
See application file for complete search history.

(56) References Cited

U.S. PATENT DOCUMENTS

| | | | | |
|---|---|---|---|---|
| 4,497,036 A * | 1/1985 | Dunn | ....................... | 361/679.09 |
| 5,077,551 A * | 12/1991 | Saitou | ........................... | 345/207 |
| 5,175,672 A * | 12/1992 | Conner et al. | ........... | 361/679.09 |
| 6,044,473 A * | 3/2000 | Kim | ............................... | 713/320 |
| 6,191,938 B1 * | 2/2001 | Ohgami et al. | .......... | 361/679.27 |
| 6,262,884 B1 * | 7/2001 | Hwang et al. | ............ | 361/679.04 |
| 6,373,006 B1 * | 4/2002 | Toki | ............................ | 200/61.7 |
| 6,781,819 B2 * | 8/2004 | Yang et al. | ............... | 361/679.09 |
| 6,906,698 B2 * | 6/2005 | Tachikawa et al. | .......... | 345/156 |
| 6,952,340 B2 * | 10/2005 | Son et al. | ................. | 361/679.09 |
| 7,173,813 B2 * | 2/2007 | Wu | ........................... | 361/679.08 |
| 7,238,900 B2 * | 7/2007 | Ulfik et al. | ................... | 200/61.7 |
| 7,352,357 B2 * | 4/2008 | Tachikawa et al. | .......... | 345/156 |
| 2003/0133261 A1* | 7/2003 | Minaguchi et al. | .......... | 361/681 |
| 2003/0210513 A1* | 11/2003 | Yen et al. | ...................... | 361/681 |
| 2011/0002096 A1* | 1/2011 | Thorson | .................. | 361/679.04 |

* cited by examiner

*Primary Examiner* — Lisa Lea Edmonds (57) ABSTRACT

An electronic device having a pivotable cover includes a cover body, a device body connected pivotably to the cover body, and a switch unit disposed on pivot connecting portions of the cover body and the device body. When the cover body is pivoted relative to the device body, the switch unit switches a power supply status of the electronic device. Thus, the convenience of operating the electronic device is enhanced.

12 Claims, 7 Drawing Sheets

SWITCH AND ELECTRONIC DEVICE HAVING A PIVOTABLE COVER

CROSS-REFERENCE TO RELATED APPLICATION

This application claims priority of Taiwanese application no. 098219327, filed on Oct. 20, 2009.

BACKGROUND OF THE INVENTION

1. Field of the Invention

This invention relates to an electronic device, more particularly to an electronic device having a pivotable cover and a switch unit adapted for switching a power supply status of the electronic device.

2. Description of the Related Art

A power switch of a conventional electronic device having a pivotable cover, such as a notebook computer, a mobile phone, etc., is usually disposed on an operational panel of a device body of the conventional electronic device or on another site on the device body accessible to manual operation, so that switching a power supply status of the conventional electronic device can be performed by manually operating the power switch.

SUMMARY OF THE INVENTION

An object of the present invention is to provide an electronic device having a pivotable cover, a power supply status of which can be switched without manual operation of a power switch.

Another object of the present invention is to provide a switch unit adapted for switching a power supply status of an electronic device having a pivotable cover.

According to the present invention, there is provided an electronic device comprising a cover body, a device body and a switch unit. The cover body includes a pair of first pivot connecting portions. The device body includes a pair of second pivot connecting portions disposed on the device housing and connected pivotably and respectively to the first pivot connecting portions. The cover body is pivotable relative to the device body about a pivot axis. The switch unit includes first and second switch components. The first switch component is disposed on one of the first pivot connecting portions. The second switch component is disposed on one of the second pivot connecting portions corresponding to said one of the first pivot connecting portions and connected electrically to a power supply circuit disposed inside the device body. The second switch component outputs a signal to the power supply circuit that controls a power supply status of a first electronic component module disposed inside the device body when the cover body is pivoted so as to form an angle relative to the device body at which the first switch component is registered with the second switch component along a direction in which the pivot axis extends.

According to another aspect of the present invention, there is provided a switch unit adapted for switching a power supply status of an electronic device. The electronic device includes a cover body having a first pivot connecting portion, and a device body having a device housing, a first electronic component module disposed in the device housing, a power supply circuit disposed on the first electronic component module, and a second pivot connecting portion disposed on the device housing. The second pivot connecting portion is connected pivotably to the first pivot connecting portion such that the cover body is pivotable relative to the device body about a pivot axis. The switch unit comprises first and second switch components. The first switch component is adapted for disposing on the first pivot connecting portion. The second switch component is adapted for disposing on the second pivot connecting portion and for connecting electrically to the power supply circuit. The second switch component is operable to output a signal to the power supply circuit that controls the power supply status of the first electronic component module when the cover body is pivoted so as to form an angle relative to the device body at which the first switch component is registered with the second switch component along a direction in which the pivot axis extends.

The advantage of the present invention resides in that the power supply status of the electronic device is controlled through repositioning the first switch component relative to the second switch component, so that when the cover body of the electronic device is pivoted relative to the device body, the power supply status of the electronic device is switched, thus eliminating the need for manual operation of a power switch and enhancing the convenience of operating the electronic device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
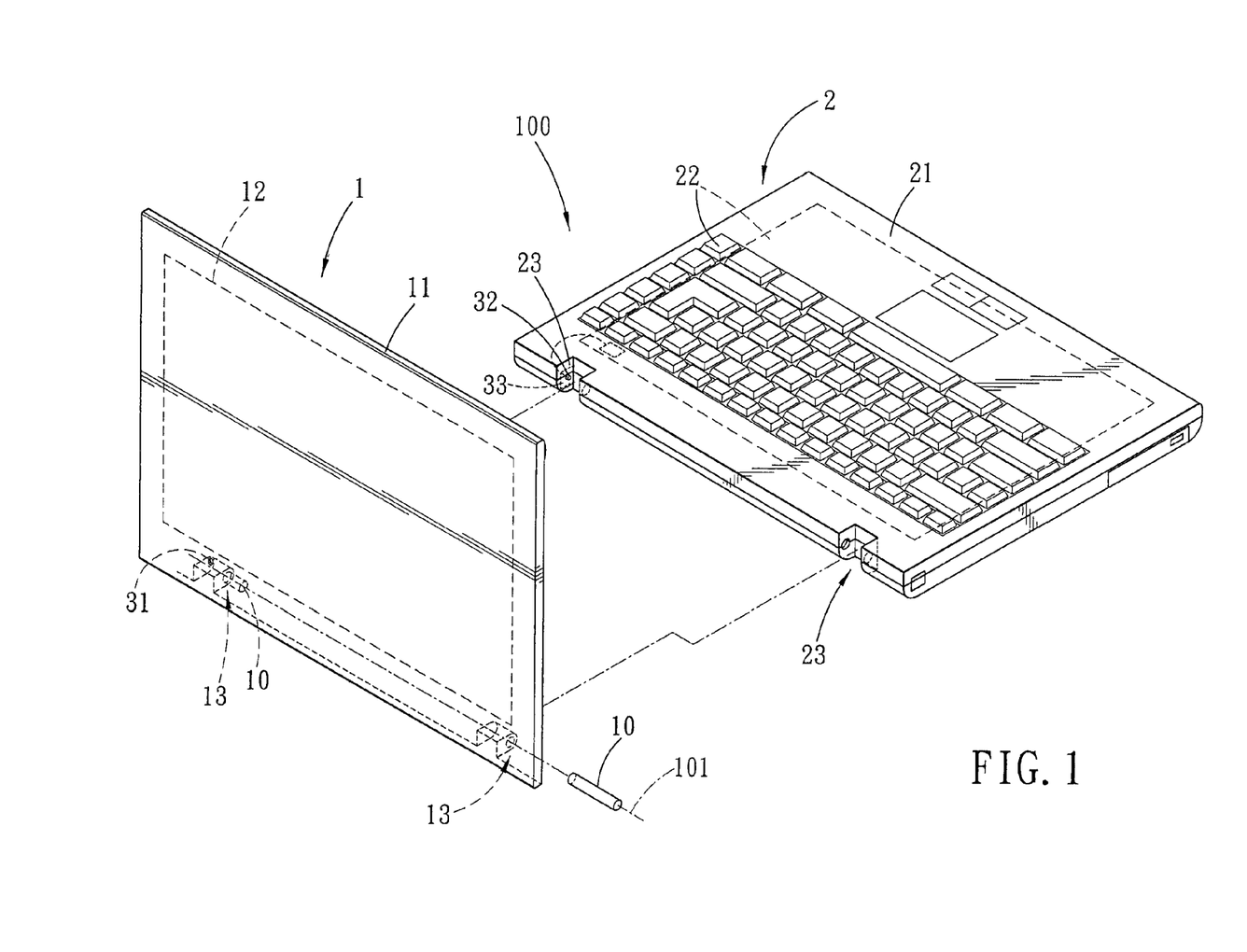
FIG. 1 is an exploded perspective view of a preferred embodiment of an electronic device having a pivotable cover according to the present invention.
Figure 2:
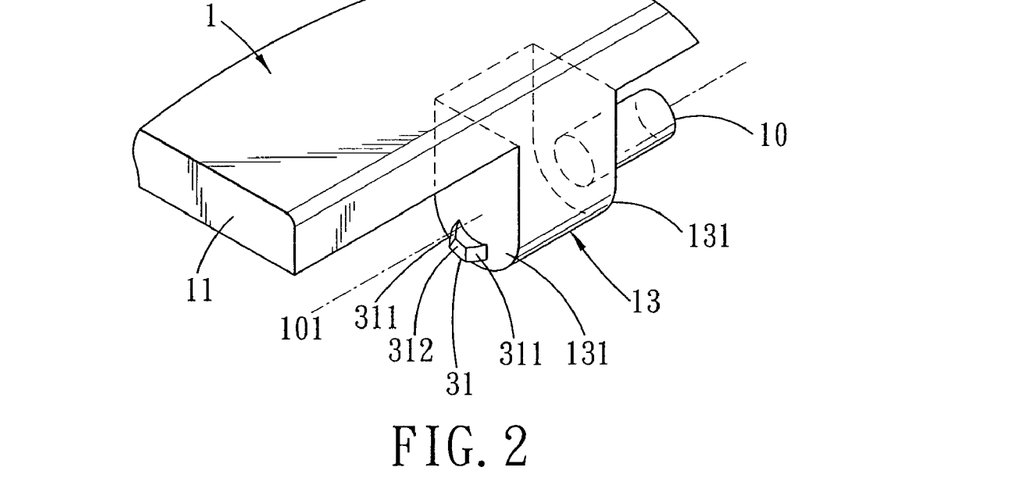
FIG. 2 is an enlarged fragmentary perspective view of a first pivot connecting portion of a cover body of the preferred embodiment.
Figure 3:
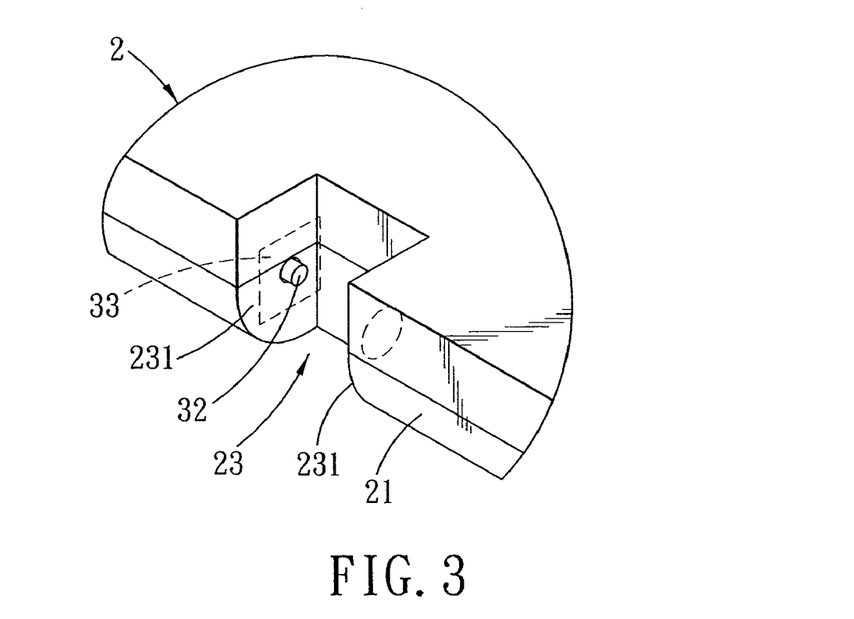
FIG. 3 is an enlarged fragmentary perspective view of a second pivot connecting portion of a device body of the preferred embodiment.

FIGS. 1 to 3 illustrate the preferred embodiment of an electronic device having a pivotable cover according to the present invention. In this embodiment, a notebook computer is taken as an example of the electronic device 100. However, the electronic device 100 can be another type of electronic device having a pivotable cover, such as a mobile phone or an electronic dictionary, and is not limited to what is disclosed herein.

Figure 5:
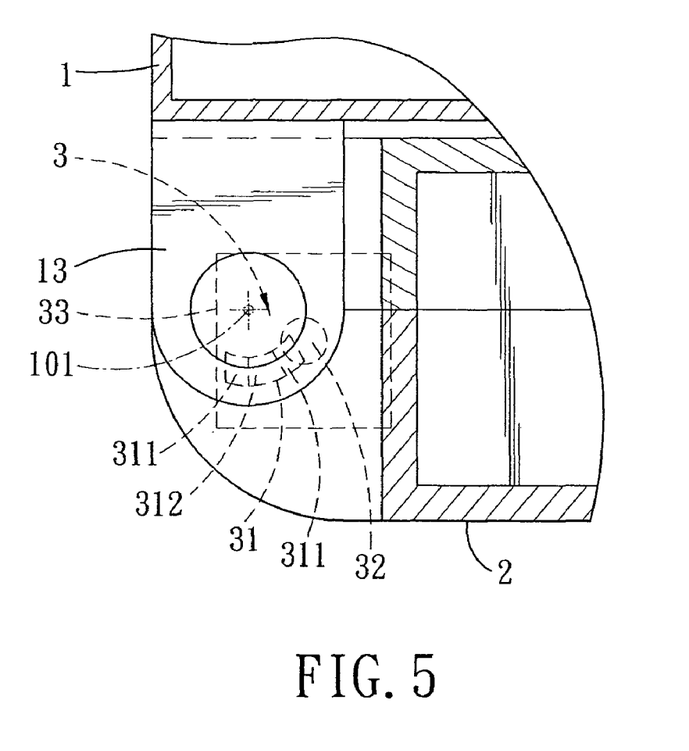
FIG. 5 is an enlarged fragmentary schematic view of the preferred embodiment for illustrating a position of the first pivot connecting portion relative to the second pivot connecting portion when the cover body is at the closed position.

The electronic device 100 includes a cover body 1, a device body 2 and a switch unit 3 (see FIG. 5).

The device body 2 includes a device housing 21, a first electronic component module 22 disposed in the device housing 21, a power supply circuit (not shown) disposed on the first electronic component module 22, and a pair of second pivot connecting portions 23 spaced apart from each other and disposed on a rear edge of the device housing 21. In this embodiment, the first electronic component module 22 includes a circuit board, a central processing unit (CPU), a hard disk, and other electronic components that meet the basic operating requirements of the device body 2. In this embodiment, each of the second pivot connecting portions 23 is formed with a groove and has a pair of groove-defining faces 231.

In this embodiment, the cover body 1 is a screen body, and includes a cover housing 11, a second electronic component module 12 disposed in the cover housing 11, and a pair of first pivot connecting portions 13 spaced apart from each other and disposed on a rear edge of the cover housing 11. The second electronic component module 12 includes a display panel unit and other electronic components that meet the basic operating requirements of the cover body 1, and is connected electrically to the first electronic component module 22 of the device body 2 and the power supply circuit via electrical wire (not shown). In this embodiment, each of the first pivot connecting portions 13 is a protruding structure having a pair of opposite outer lateral faces 131.

The cover body 1 is connected pivotably to the device body 2 via extension of each of the protruding first pivot connecting portions 13 into a corresponding one of the grooves of the second pivot connecting portions 23, and extension of a pair of pivot axles 10 through engaged pairs of the first and second pivot connecting portions 13,23, respectively. The pivot axles 10 can be formed respectively on the first pivot connecting portions 13 and extend transversely into corresponding ones of the second pivot connecting portions 23, or can be a pair of independent components extending transversely and respectively through the engaged pairs of the first and second pivot connecting portions 13,23. Such a configuration allows the cover body 1 to pivot relative to the device body 2 about a pivot axis 101 that extends through the engaged pairs of the first and second pivot connecting portions 13,23 and that is parallel to the rear edge of the cover housing 11. The cover body 1 is thus pivotable between an open position, in which the cover body 1 is pivoted away from the device body 2, and a closed position, in which the cover body 1 is pivoted toward the device body 2. Moreover, in such a configuration, the outer lateral faces 131 of each of the first pivot connecting portions 13 confront respectively the groove-defining faces 231 of a corresponding one of the second pivot connecting portions 23.

The switch unit 3 includes a first switch component 31 disposed on one of the first pivot connecting portions 13 of the cover body 1, and a second switch component 32. In this embodiment, the first switch component 31 is a block that protrudes from one of the outer lateral faces 131 of the first pivot connecting portions 13, and that extends along an arc having the pivot axis 101 as the center of curvature thereof. The block includes a pair of inclined face portions 311 at two ends thereof, and a central face portion 312 disposed between and interconnecting the inclined face portions 311, wherein the inclined face portions 311 ascend from said one of the outer lateral faces 131 to the central face portion 312. Preferably, the switch unit 3 further includes a circuit board 33 disposed in one of the second pivot connecting portions 23 of the device body 2 adjacent to one of the groove-defining faces 231 that confronts said one of the outer lateral faces 131 on which the first switch component 31, i.e., the block, is disposed. The second switch component 32 is preferably a push-button switch disposed on the circuit board 33 and extending outwardly of said one of the groove-defining faces 231 and into the groove. The second switch component 32 is configured such that, when pressed by an external force, the second switch component 32 is retracted toward said one of the groove-defining faces 231 of the second pivot connecting portions 23 and outputs a signal to the power supply circuit that controls a power supply status of the electronic device 100.

Figure 4:
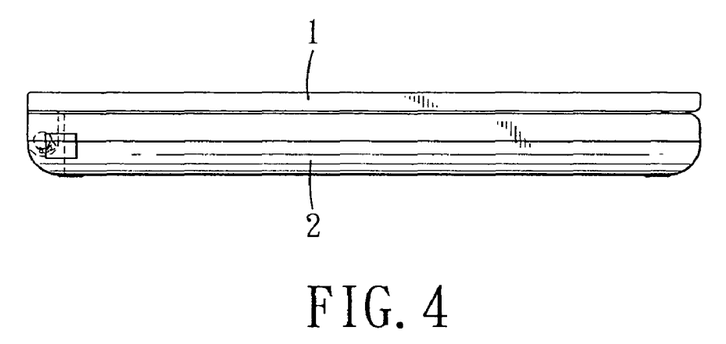
FIG. 4 is a side view of the preferred embodiment for illustrating the cover body at a closed position relative to the device body.

Referring to FIGS. 1, 4 and 5, when the cover body 1 is at the closed position, the first switch component 31 is offset from the second switch component 32 to an extent that the first switch component 31 does not exert pressure on the second switch component 32 that is sufficient to cause the second switch component 32 to output the signal.

Figure 6:
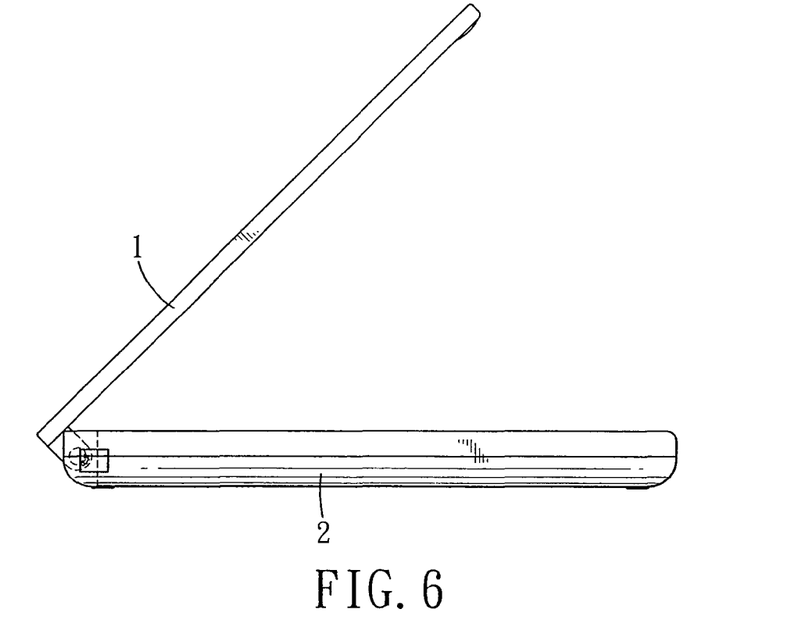
FIG. 6 is a side view of the preferred embodiment for illustrating the cover body pivoted away from the device body so as to form an angle.
Figure 7:
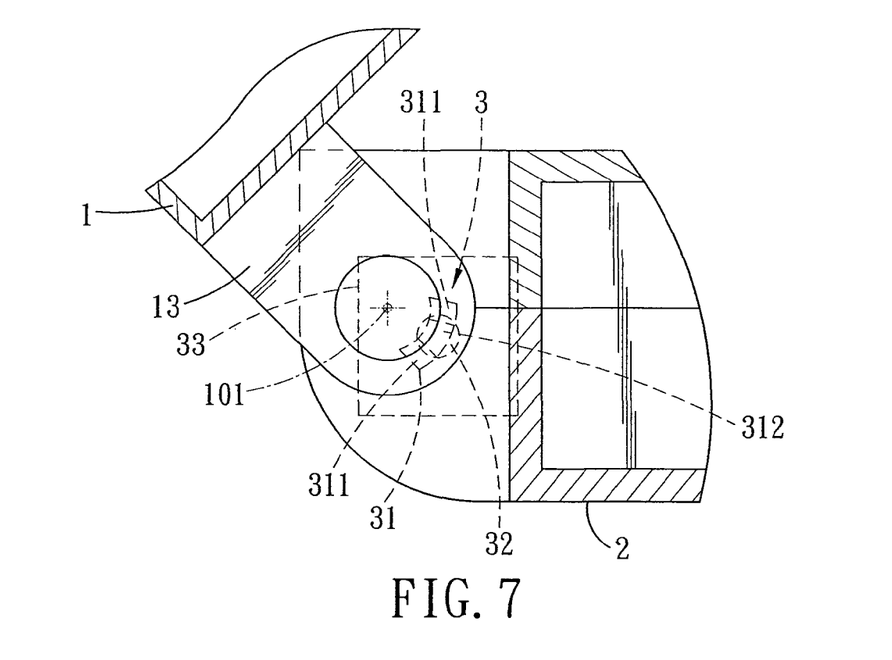
FIG. 7 is an enlarged fragmentary schematic view of the preferred embodiment for illustrating a position of the first pivot connecting portion relative to the second pivot connecting portion when the cover body is pivoted away from the device body so as to form the angle.

Referring to FIGS. 1, 6 and 7, when the cover body 1 is pivoted away from the device body 2 toward the open position such that the cover body 1 forms an angle relative to the device body 2 (such as 45 degrees), the first switch component 31, i.e., the block, is moved along the arc having the pivot axis 101 as a curvature center thereof to a position that is registered with that of the second switch component 32 along a direction in which the pivot axis 101 extends (see FIG. 7), and presses the second switch component 32, i.e., the push button switch, so that the second switch component 32, in response, outputs the signal to the power supply circuit. The power supply circuit then performs control so that power is supplied for operating the first and second electronic component modules 12,22. In other words, when the switch unit 3 is used for controlling the power supply status of the electronic device 100, the power supply status of the electronic device 100 is switched via pivoting the cover body 1 between the open and closed positions, rather than via manual operation of a power switch disposed on the device body 2 as taught in the prior art.

When the cover body 1 is pivoted relative to the device body 2, the second switch component 32 is guided by the inclined face portions 311 of the first switch component 31 so as to register with and pass the first switch component 31 smoothly.

Figure 8:
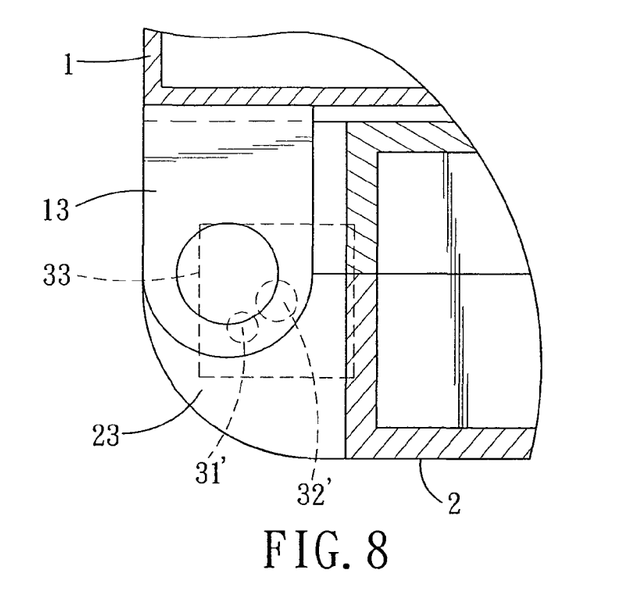
FIG. 8 is a side view similar to that of FIG. 5 for illustrating use of an infrared light transmitter and an infrared light receiver as first and second switch components of the preferred embodiment, respectively.
Figure 9:
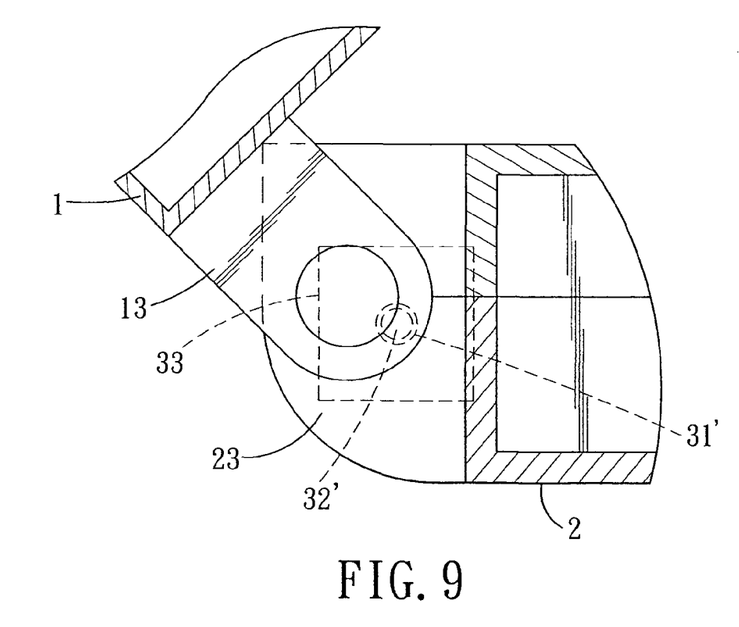
FIG. 9 is a side view similar to that of FIG. 7 for illustrating use of the infrared light transmitter and the infrared light receiver as the first and second switch components of the preferred embodiment, respectively.

Referring to FIGS. 8 and 9, in one modification, the first switch component 31' is an infrared light transmitter disposed on one of the first pivot connecting portions 13, and the second switch component 32' is an infrared light receiver disposed on a corresponding one of the second pivot connecting portions 23. The dispositions of the first and second switch components 31', 32' are the same as that described before in connection with the switch components 31,32 of FIGS. 1 to 7. When the cover body 1 is pivoted relative to the device body 2 so as to form the angle at which the first switch component 31' is registered with the second switch component 32', the second switch component 32' receives a signal from the first switch component 31', and the second switch component 32', in response, outputs the signal to the power supply circuit.

It should be noted that the dispositions of the first switch component 31, 31' and the second switch component 32, 32' can be interchanged. That is, the first switch component 31, 31' can be disposed on one of the second pivot connecting portions 23, and the second switch component 32, 32' can be disposed on a corresponding one of the first pivot connecting portions 13. Moreover, although in this embodiment, the cover body 1 and the device body 2 have pairs of the first and second pivot connecting portions 13,23, respectively, the quantities of the first and second pivot connecting portions 13, 23 are not limited to such. For example, another embodiment can include only one first pivot connecting portion 13 and only one second pivot connecting portion 23, depending on the pivot connecting structure of the electronic device 100. Moreover, the first pivot connecting portion 13 can be formed with the groove, and the second pivot connecting portion 23 can be the protruding structure.

Furthermore, although in this embodiment, the power supply circuit performs control such that power is supplied to both the first electronic component module 22 and the second electronic component module 12 upon receipt of the signal from the switch unit 3, the power supply circuit can be configured to perform control such that power is supplied to only one of the first electronic component module 22 and the second electronic component module 12 upon receipt of the signal. In other words, the switch unit 3 can be configured to switch the power supply status of one of the cover body 1 and the device body 2.

Figure 10:
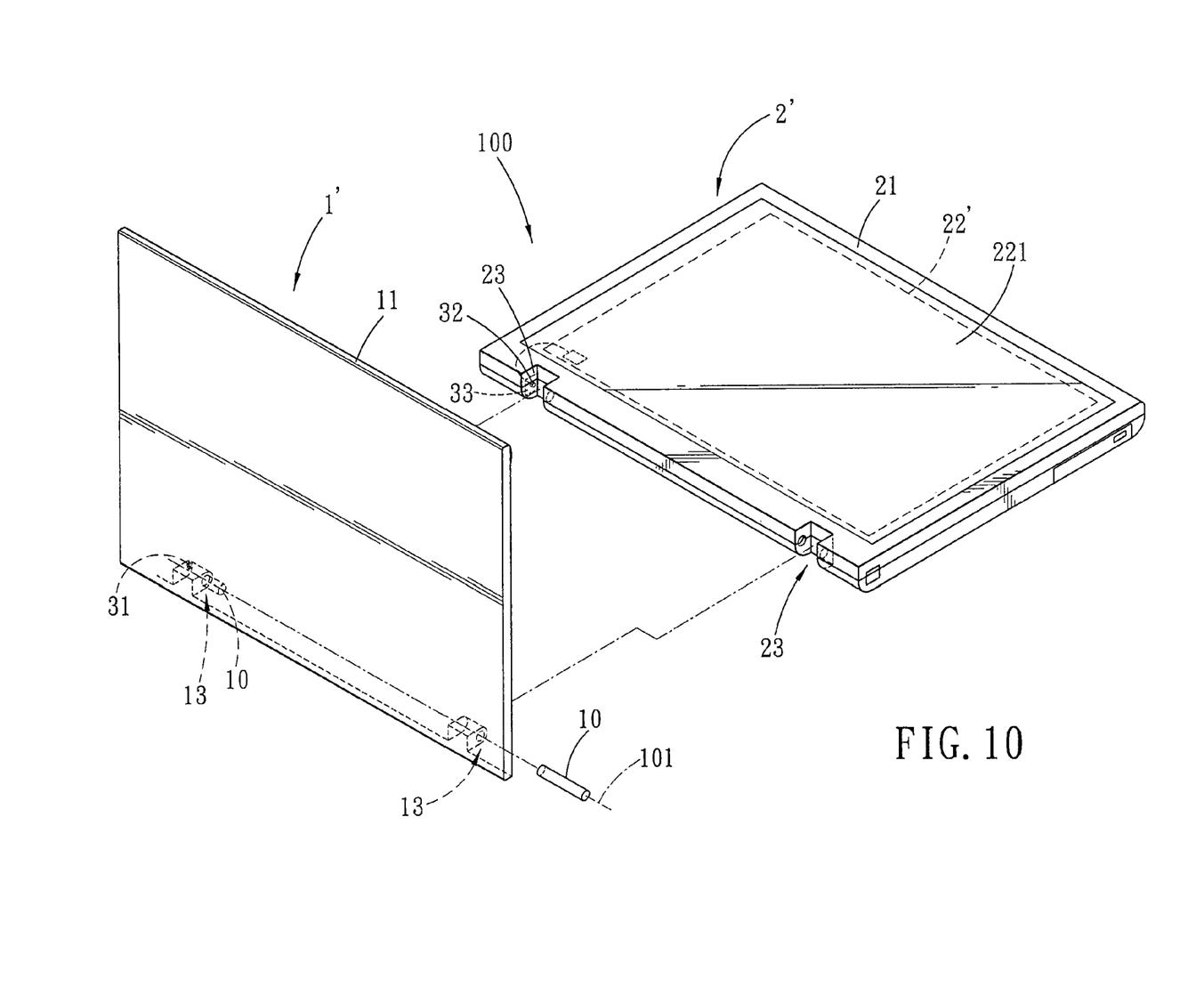
FIG. 10 is a perspective view of the device body of the preferred embodiment for illustrating a display panel unit included in a first electronic component module thereof.
Figure 11:
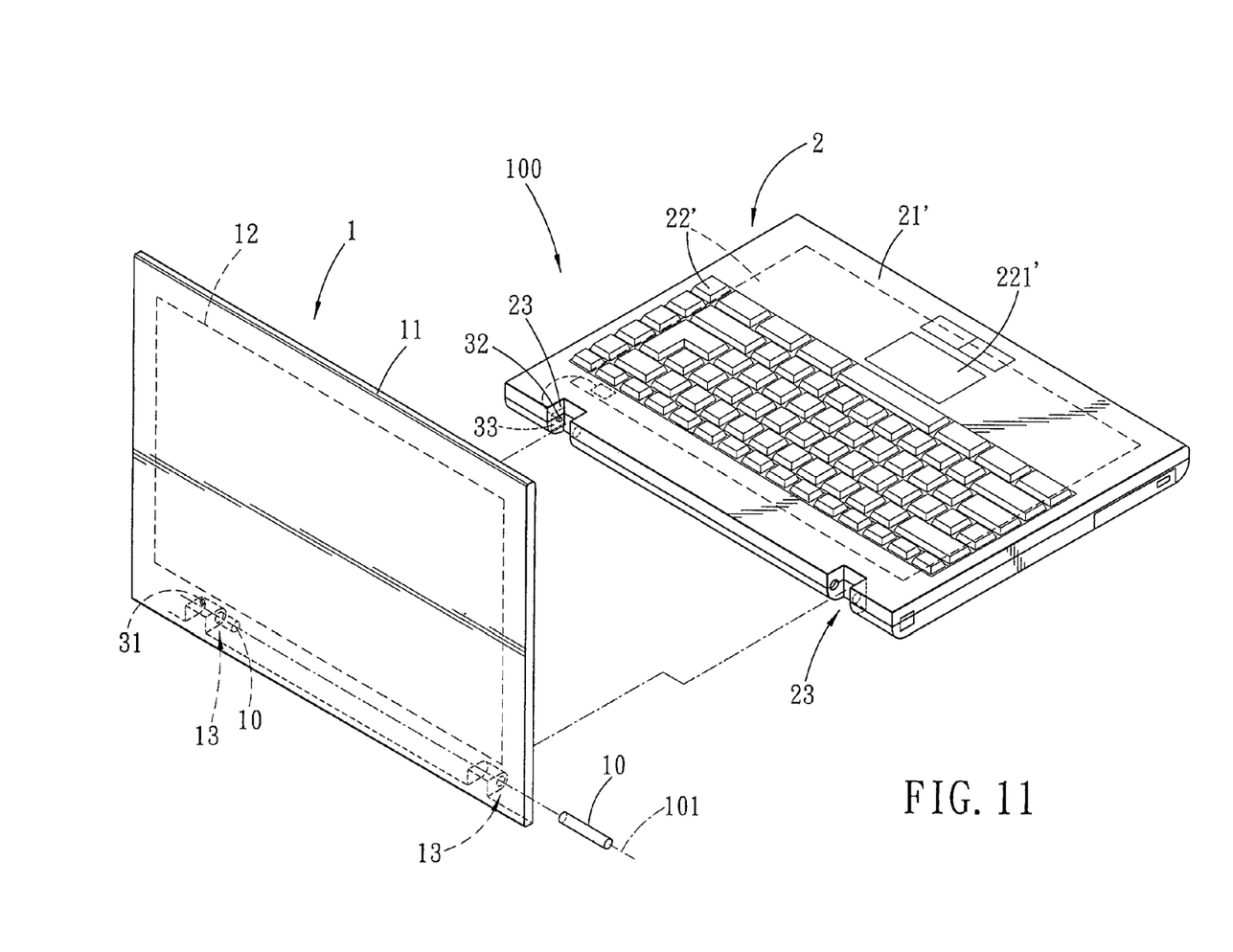
FIG. 11 is a perspective view of the device body of the preferred embodiment for illustrating another type of display panel unit included in the first electronic component module thereof.

Moreover, although in this embodiment, the cover body 1 is a screen body, in other possible modifications, as shown in FIGS. 10 and 11, respectively, the cover body 1' can be a plastic or metal cover that does not include electronic components and that only serves to protect the device body 2'. The first electronic component module 22' can further include the display panel unit disposed on the device housing 21', or the device body 2' can itself be a screen body while the first electronic component module 22' is the display panel unit. The display panel unit can be a touch control display panel unit 221, 221'. When the first electronic component module 22' is the display panel unit, the power supply circuit can be a power board used for controlling the display panel unit.

It is worth noting that, in this embodiment, operation of the switch unit 3 is realized such that when the cover body 1 is pivoted to the open position from the closed position, the power supply status of the electronic device 100 is switched to an on status, and when the cover body 1 is pivoted from the open position to the closed position, and the first switch component 31 has moved past the second switch component 32, the power supply status of the cover body 1 and the device body 2 are both switched to an off status. Nevertheless, the power supply circuit or associated software can be configured such that, when the cover body 1 is pivoted to the closed position, and the first switch component 31 has moved past the second switch component 32, the power supply status of one or both of the cover body 1 and the device body 2 is switched to another power supply status associated with another operational mode, such as an idle mode. For instance, if the electronic device 100 is a mobile phone, pivoting the cover body 1 to the closed position from the open position can switch the power supply status to one associated with a power-saving mode, and pivoting the cover body 1 to the open position from the closed position can switch the power supply status to one associated with a normal operating mode.

In summary, the power supply status of the electronic device 100 is controlled through repositioning the first switch component 31, 31' relative to the second switch component 32, 32' so that when the cover body 1, 1' of the electronic device 100 is pivoted relative to the device body 2, 2', the power supply status of the electronic device 100 is simultaneously switched, thus eliminating the need for manual operation of a power switch and enhancing the convenience of operating the electronic device 100.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device, comprising:
   a cover body including a pair of first pivot connecting portions;
   a device body including a pair of second pivot connecting portions disposed on said device housing and connected pivotably and respectively to said first pivot connecting portions, said cover body being pivotable relative to said device body about a pivot axis; and
   a switch unit including
      a first switch component disposed on one of said first pivot connecting portions, and
      a second switch component disposed on one of said second pivot connecting portions corresponding to said one of said first pivot connecting portions and connected electrically to a power supply circuit disposed inside said device body, said second switch component outputting a signal to said power supply circuit that controls a power supply status of a first electronic component module disposed inside said device body when said cover body is pivoted so as to form an angle relative to said device body at which said first switch component is registered with said second switch component along a direction in which the pivot axis extends.

2. The electronic device as claimed in claim 1, wherein:
said one of said first pivot connecting portions has a pair of opposite outer lateral faces, and said first switch component is disposed on one of said outer lateral faces; and
said second switch component is disposed on a groove-defining face of said one of said second pivot connecting portions that confronts said one of said outer lateral faces on which said first switch component is disposed.

3. The electronic device as claimed in claim 2, wherein:
said first switch component is a block protruding from said one of said outer lateral faces, and said second switch component is a push button switch extending outwardly of said groove-defining face into said groove and connected electrically to said power supply circuit, and wherein, when said cover body is pivoted so as to form the angle relative to said device body at which said first switch component is registered with said second switch component, said second switch component is pressed by said first switch component outputs the signal.

4. The electronic device as claimed in claim 3, wherein said block extends along an arc having the pivot axis as the center of curvature thereof.

5. The electronic device as claimed in claim 4, wherein said block includes a pair of inclined face portions and a central face portion disposed between and interconnecting said inclined face portions.

6. The electronic device as claimed in claim 1, wherein one of said first and second switch components has an infrared light receiver, and the other of said first and second switch components has an infrared light transmitter.

7. A switch unit adapted for switching a power supply status of an electronic device, the electronic device including a cover body having a first pivot connecting portion, and a device body having a device housing, a first electronic component module disposed in the device housing, a power supply circuit disposed on the first electronic component module, and a second pivot connecting portion disposed on the device housing and connected pivotably to the first pivot connecting portion, the cover body being pivotable relative to the device body about a pivot axis, said switch unit comprising:
- a first switch component adapted for disposing on the first pivot connecting portion, and
- a second switch component adapted for disposing on the second pivot connecting portion and for connecting electrically to the power supply circuit;
- wherein said second switch component is operable to output a signal to the power supply circuit that controls the power supply status of the first electronic component module when the cover body is pivoted so as to form an angle relative to the device body at which said first switch component is registered with said second switch component along a direction in which the pivot axis extends.

8. The switch unit as claimed in claim 7, the first pivot connecting portion being a protruding structure having a pair of opposite outer lateral faces, the second pivot connecting portion being formed with a groove that engages the first pivot connecting portion, wherein said first switch component is for disposing on one of the outer lateral faces, and said second switch component is for disposing on a groove-defining face of the second pivot connecting portion that confronts said one of the outer lateral faces on which said first switch component is to be disposed.

9. The switch unit as claimed in claim 8, wherein
said first switch component is a block for protruding from said one of the outer lateral faces, and said second switch component is a push button switch disposed for extending outwardly of the groove-defining face into the groove and for connecting electrically to the power supply circuit, and wherein, when the cover body is pivoted so as to form the angle relative to the device body at which said first switch component is registered with said second switch component, said second switch component is pressed by said first switch component and outputs the signal.

10. The switch unit as claimed in claim 9, wherein said block extends along an arc having the pivot axis as the center of curvature thereof.

11. The switch unit as claimed in claim 10, wherein said block includes a pair of inclined face portions and a central face portion disposed between and interconnecting said inclined face portions.

12. The switch unit as claimed in claim 7, wherein one of said first and second switch components is an infrared light receiver, and the other of said first and second switch components is an infrared light transmitter.

* * * * *